United States Patent
Copeland et al.

(10) Patent No.: US 6,912,323 B2
(45) Date of Patent: Jun. 28, 2005

(54) METHOD AND APPARATUS FOR FAST SIGNAL CONVOLUTION USING SEPARATED-SPLINE KERNEL

(75) Inventors: David Jeremy Copeland, Frankfort, KY (US); Richard E. Crandall, Portland, OR (US); Ulrich Hofmann, Castro Valley, CA (US); Richard L. Lozes, Pleasanton, CA (US)

(73) Assignee: Applied Materials, Inc., Santa Clara, CA (US)

(*) Notice: Subject to any disclaimer, the term of this patent is extended or adjusted under 35 U.S.C. 154(b) by 952 days.

(21) Appl. No.: 09/866,890

(22) Filed: May 29, 2001

(65) Prior Publication Data

US 2001/0051860 A1 Dec. 13, 2001

Related U.S. Application Data

(63) Continuation-in-part of application No. 09/480,908, filed on Jan. 11, 2000, now Pat. No. 6,701,028.

(51) Int. Cl.[7] ................................................. G06K 9/64
(52) U.S. Cl. ...................... 382/279; 242/163; 242/441; 379/406.11; 708/420
(58) Field of Search ................................. 382/100, 254, 382/260, 264, 265, 272, 275–277, 279–281; 242/163, 327.1, 441, 447, 477.4, 520, 536, 602, 910; 379/406.11, 306, 560; 708/315, 420, 803

(56) References Cited

U.S. PATENT DOCUMENTS

| | | | | |
|---|---|---|---|---|
| 4,646,256 | A | | 2/1987 | Bracewell .................... 364/725 |
| 4,720,871 | A | | 1/1988 | Chambers ..................... 382/42 |
| 4,918,742 | A | * | 4/1990 | Simonds ...................... 382/304 |
| 5,151,953 | A | * | 9/1992 | Landeta ....................... 382/279 |
| 5,881,178 | A | | 3/1999 | Tsykalov et al. ........... 382/260 |
| 5,917,961 | A | * | 6/1999 | Huonder ...................... 382/279 |
| 5,926,580 | A | * | 7/1999 | McCoy ........................ 382/279 |
| 6,580,836 | B2 | * | 6/2003 | Politis ......................... 382/279 |

* cited by examiner

Primary Examiner—Kanjibhai Patel
Assistant Examiner—Abollfazl Tabatabai
(74) Attorney, Agent, or Firm—Jung-hua Kuo

(57) ABSTRACT

A fast convolution method applicable to convolving a signal (indicative of an n-dimensional pattern, where n is greater than or equal to two) with a smooth kernel that can be approximated by a separated-spline kernel, and a system configured to perform such method using software or signal processing circuitry. Unlike Fourier-based convolution methods which require on the order of N log N arithmetic operations for a signal of length N, the method of the invention requires only on the order of N arithmetic operations to do so. Unlike wavelet-based convolution approximations (which typically also require more arithmetic operations than are required in accordance with the invention to convolve the same signal), the method of the invention is exact for convolution kernels which are spline kernels.

36 Claims, 2 Drawing Sheets

METHOD AND APPARATUS FOR FAST SIGNAL CONVOLUTION USING SEPARATED-SPLINE KERNEL

CROSS-REFERENCE TO RELATED APPLICATION

The present application is a continuation-in-part of U.S. patent application Ser. No. 09/480,908, filed Jan. 11, 2000 now U.S. Pat. No. 6,701,028 B1 dated Mar. 2, 2004 by Richard E. Crandall, and which is assigned to Etec Systems, Inc. The full text of U.S. patent application Ser. No. 09/480,908 is incorporated herein by reference.

FIELD OF THE INVENTION

The invention relates to signal processing methods and apparatus for performing convolution on data indicative of a pattern (e.g., image data indicative of a pixel array). In accordance with the invention, the convolution kernel is (or is approximated by) a separated-spline function.

BACKGROUND OF THE INVENTION

Convolution is commonly performed on signals in many contexts, including the fields of sound, still image, video, lithography, and radio (radar) signal processing. Typically, the signals to be convolved are pattern signals. Each of the expressions "pattern" and "pattern signal" is used herein in a broad sense to denote a one-dimensional sequence or two-dimensional (or higher dimensional) array of data words (which can be, but need not be pixels). Typically, the data words comprise binary bits, and the convolution is performed in discrete fashion on the binary bits using software, digital signal processing circuitry, custom hardware, or FPGA systems (field programmable gate array based computing systems).

The term "data" herein denotes one or more signals indicative of data, and the expression "data word" herein denotes one or more signals indicative of a data word.

The motivations for implementing convolution rapidly, even when processing data indicative of very large patterns, are myriad. The present invention was motivated by the need for proximity correction in the field of lithography. In such problems, one attempts a two-dimensional convolution between data indicative of a large pattern "p" (where the pattern is a pixel array) and a diffusion kernel "d". Often the kernel "d" is a Gaussian or a superposition of Gaussians, or is otherwise a smooth kernel. More specifically, the present invention grew out of attempts to establish a suitable "O(NN')" algorithm (an algorithm requiring not more than on the order of NN' multiplications and additions) for convolving a two-dimensional pattern comprising NN' pixels, where each of N and N' is very large) with a Gaussian kernel (or other smooth kernel) such that the convolution is exact or very close to exact.

The objective in performing proximity correction (in the field of lithography) is to generate a "raw" optical signal (or "raw" electron beam signal) which can be input to a set of reflective or refractive optics (or electron beam optics), in order to cause the output of the optics to produce a desired pattern on a mask or wafer. To determine the characteristics of a raw optical signal (or raw electron beam signal) that are needed to produce the desired pattern on the mask or wafer, a deconvolution operation is typically performed on a very large array of pixels (which determine a pattern "p") in order to correct for the well known proximity problem. In the case of electron beam lithography, the proximity problem results from electron scattering in the substrate (mask or wafer) being written. Such scattering exposes broadened areas on the substrate to electrons (i.e., an area surrounding each pixel to be written in addition to the pixel itself), with the scattering effectively broadening the electron beam beyond the beam diameter with which the beam is incident on the substrate.

In nearly all proximity correction schemes, such a deconvolution operation includes at least one convolution step. Accordingly, in performing typical proximity correction, a very large array of pixels (determining a pattern "p") must be convolved with a diffusion kernel. Although such a convolution is typically performed on a pattern comprising a very large array of binary pixels, this restriction is not essential in the following discussion and is not essential to implementation of the invention. Indeed, the invention can implement convolution on data indicative of any pattern "p" with a smooth convolution kernel "d" having characteristics to be described below.

For data indicative of a pattern "p" and a convolution kernel "d" we consider the cyclic convolution:

$$(d \times_C p)_n = \sum_{i+j=n \pmod N} d_i p_j,$$

where $\times_C$ denotes that the convolution operator has cyclic character, and an acyclic convolution which differs only in the indicial constraint and range:

$$(d \times_A p)_n = \sum_{i+j=n} d_i p_j,$$

where "$\times_A$" denotes that convolution operator has acyclic character.

For simplicity, we restrict much of the discussion herein to one-dimensional cases (in which the pattern p is an ordered set of N data values and the kernel is an ordered set of M values). Despite this, it should be appreciated that in typical embodiments of the invention, the pattern is two-dimensional (a two-dimensional array $p_{jk}$ of data values determines the pattern) and the summation defining the convolution (a summation which corresponds to either one of the summations set forth in the previous paragraph) is over index k as well as index j of the array $p_{jk}$. In the case of a two-dimensional pattern p determined by an N by N' array of data values, the indices n, i, j and domain lengths N in the formulae set forth in the previous paragraph are 2-vectors.

In one-dimensional cases, the result of the cyclic convolution has length N (it comprises N data values), and the result of the acyclic convolution has length M+N−1.

It is standard that a cyclic convolution $d \times_C p$ can be cast as an equivalent matrix-vector product:

$$d \times_C p = Dp,$$

where D is the circulant matrix of d (hereinafter the "circulant" of d), whose 1-dimensional form is defined (assuming that N is greater than 3) as:

$$D = \begin{pmatrix} d_0 & d_1 & d_2 & d_3 & \cdots & d_{N-1} \\ d_{N-1} & d_0 & d_1 & d_2 & \cdots & d_{N-2} \\ \vdots & & & & & \vdots \\ d_1 & d_2 & d_3 & d_4 & \cdots & d_0 \end{pmatrix}.$$

Therefore, conventional methods for cyclic convolution can be cast in the language of matrix algebra. Acyclic convolution can be obtained with similar matrix manipulations.

For the sake of simplicity, we will use the symbol × hereinbelow to denote convolution having either acyclic or cyclic character. In most of the discussion the symbol will refer to convolution having acyclic character. Those of ordinary skill in the art will recognize that, given a specified acyclic convolution, a corresponding cyclic convolution can be implemented by slight modification of the parameters (e.g., the boundary conditions and definition of the circulant of the kernel) that determine the acyclic convolution.

Above-referenced U.S. patent application Ser. No. 09/480,908 discloses a fast convolution method whose central idea (in one-dimensional embodiments) is to approximate a smooth kernel d by a polynomial spline kernel $f$ (where $f$ is a spline function $f(x)$ which is piecewise a polynomial of degree $\delta$ with L pieces $f_1(x)$), and then to use appropriate operators that annihilate (or flatten) each polynomial of given degree (in a manner to be explained) to calculate the convolution of $f$ and p quickly. In some embodiments, the smooth kernel d is approximated by a spline kernel $f$ which is not a polynomial spline kernel, but which consists of L pieces defined over adjacent segments of its domain (in typical two-dimensional cases, the latter spline kernel is a radially symmetric function whose domain is some continuous or discrete set of values of the radial parameter). Though "spline" convolution as described in U.S. application Ser. No. 09/480,908 has features reminiscent of conventional wavelet schemes and is an O(N) algorithm (as are wavelet schemes), an advantage of "spline" convolution is that it can be performed (on data indicative of a pattern p consisting of N data values) with cN arithmetic operations (multiplications and additions), whereas conventional wavelet convolution on the same data would require bN arithmetic operations, where the factor "b" is typically (i.e., with typical error analysis) significantly larger than the factor "c." In other words, the implied big-O constant for the spline convolution is significantly smaller than the typical such constant for conventional wavelet convolution.

Spline convolution, as described in U.S. application Ser. No. 09/480,908, is a method for performing cyclic or acyclic convolution of a pattern "p" (i.e., data indicative of a pattern "p") with a smooth diffusion kernel d, to generate data indicative of the convolution result r=Dp, where D is the circulant of d. The pattern "p" can be one-dimensional in the sense that it is determined by a continuous (or discrete) one-dimensional domain of data values (e.g., pixels), or it can be two-dimensional in the sense that it is determined by a continuous two-dimensional domain of data values (or a two-dimensional array of discrete data values), or p can have dimension greater than two. In typical discrete implementations, the pattern p is one-dimensional in the sense that it is determined by a discrete, ordered set of data values (e.g., pixels) $p_i$, where i varies from 0 to N−1 (where N is the signal length), or it is two-dimensional in the sense that it is determined by an array of data values $p_{ij}$, where i varies from 0 to N−1 and j varies from 0 to N'−1, or it has dimension greater than two (it is determined by a three or higher-dimensional set of data values). Typically, the kernel d is determined by an array of data values $d_{ij}$, where i varies from 0 to N−1 and j varies from 0 to N'−1 (but the kernel d can alternatively be determined by a discrete set of data values $d_0$ through $d_{N-1}$).

In some embodiments described in U.S. application Ser. No. 09/480,908, the convolution Dp is accomplished by performing the steps of:

(a) approximating the kernel d by a polynomial spline kernel $f$ (unless the kernel d is itself a polynomial spline kernel, in which case d=$f$ and step (a) is omitted);

(b) calculating q=Bp=$\Delta_{\delta+1}$Fp, where F is the circulant of kernel $f$, and $\Delta_{\delta+1}$ is an annihilation operator (whose form generally depends on the degree $\delta$ of the polynomial segments of $f$) which operates on circulant F in such a manner that $\Delta_{\delta+1}$F=B is sparse; and (c) backsolving $\Delta_{\delta+1}$r=q to determine r=Fp.

In cases in which the kernel d is itself a polynomial spline kernel (so that d=$f$ and F=D), the method yields an exact result (r=Dp). Otherwise, the error inherent in the method is ($f$−d)×p, where × denotes convolution, and thus the error is bounded easily.

In one-dimensional cases (in which the pattern to be convolved is a one-dimensional pattern of length N), $\Delta_{\delta+1}$ has the form of the N×N circulant matrix defined as follows:

$$\Delta_{\delta+1} = \begin{bmatrix} +\binom{\delta+1}{0} & -\binom{\delta+1}{1} & +\binom{\delta+1}{2} & -\binom{\delta+1}{3} & \cdots & 0 \\ 0 & +\binom{\delta+1}{0} & -\binom{\delta+1}{1} & +\binom{\delta+1}{2} & \cdots & 0 \\ \vdots & & & & & \vdots \\ -\binom{\delta+1}{1} & +\binom{\delta+1}{2} & \cdots & & 0 & +\binom{\delta+1}{0} \end{bmatrix}$$

in which each entry is a binomial coefficient, and $\delta$ is the maximum degree of the spline segments of spline kernel $f$. For example, $\delta$=2 where the spline kernel $f$ comprises quadratic segments. In two- or higher-dimensional cases, the annihilation operators can be defined as $$\Delta = \partial_{x_1}^{n_1} \partial_{x_2}^{n_2} \cdots \partial_{x_d}^{n_d},$$

where $\partial_{x_h}^{nh}$ is the n-th partial derivative with respect to the h-th of d coordinates. For example, the Laplacian $$\nabla^2 = \partial_{x_1}^2 + \cdots + \partial_{x_d}^2$$

will annihilate piecewise-planar functions of d-dimensional arguments $f=f(x_1, x_2, \ldots x_d)$.

In the one-dimensional case, the end points of each segment (the "pivot points") of spline kernel $f$ may be consecutive elements $d_i$ and $d_{i+1}$ of kernel d, and step (a) can be implemented by performing curve fitting to select each segment of the spline kernel as one which adequately matches a corresponding segment of the kernel d. In some implementations, appropriate boundary conditions are satisfied at each pivot point, such as by derivative-matching or satisfying some other smoothness criterion at the pivot points.

In some implementations described in application Ser. No. 09/480,908, step (c) includes a preliminary "ignition" step in which a small number of the lowest components of r=Fp are computed by exact multiplication of p by a few rows of F, and then a step of determining the rest of the components of r using a natural recurrence relation determined by the spline kernel and the operator $\Delta_{\delta+1}$. For example, in the one-dimensional case, the lowest components of r are $r_0, r_1, \ldots, r_\delta$, where "$\delta$" is the maximum degree of the spline segments of spline kernel $f$ (for example $r_0, r_1$, and $r_2$ where the spline kernel comprises quadratic segments), and these ($\delta+1$) components are determined by exact multiplication of p by ($\delta+1$) rows of F. The ($\delta+1$) components can alternatively be determined in other ways. Then, the rest of the components "$r_\delta$" are determined using a natural recurrence relation determined by the operator $\Delta_{\delta+1}$. The "ignition" operation which generates the components $r_0, r_1, \ldots, r_\delta$, can be accomplished with O(N) computations. The recurrence relation calculation can also be accomplished with O(N) computations.

In other embodiments, the method disclosed in U.S. application Ser. No. 09/480,908 for performing the convolution r=Dp includes the steps of:

(a) approximating the kernel d by a polynomial spline kernel $f$ (unless the kernel d is itself a polynomial spline kernel, in which case d=$f$ and step (a) is omitted);

(b) calculating q=Bp=$\Delta_\delta$Fp, where F is the circulant of kernel $f$ and $\Delta_\delta$ is a flattening operator (whose form generally depends on the degree $\delta$ of the polynomial segments of F, and which operates on circulant F such that B=$\Delta_\delta$F is almost everywhere a locally constant matrix); and (c) backsolving $\Delta_\delta$r=q to determine r=Fp. In one-dimensional cases (in which p has length N), $\Delta_\delta$ has the form of the N×N circulant matrix:

$$\Delta_\delta = \begin{bmatrix} +\binom{\delta}{0} & -\binom{\delta}{1} & +\binom{\delta}{2} & -\binom{\delta}{3} & \cdots & 0 \\ 0 & +\binom{\delta}{0} & -\binom{\delta}{1} & +\binom{\delta}{2} & \cdots & 0 \\ \vdots & & & & & \vdots \\ -\binom{\delta}{1} & +\binom{\delta}{2} & \cdots & & 0 & +\binom{\delta}{0} \end{bmatrix}$$

in which each entry is a binomial coefficient, and $\delta$ is the maximum degree of the spline segments of spline kernel $f$. In higher-dimensional cases, the flattening operator $\Delta_{67}$ is defined similarly.

In other embodiments disclosed in U.S. application Ser. No. 09/480,908, the convolution Dp (where D is the circulant of smooth kernel d) includes the steps of:

(a) approximating the kernel d by a spline kernel $f$ which is not a polynomial spline kernel (unless the kernel d is itself such a spline kernel, other than a polynomial spline kernel, in which case d=$f$ and step (a) is omitted);

(b) calculating q=Bp=AFp, where F is the circulant of kernel $f$ and A is an annihilation or flattening operator, where A operates on circulant F in such a manner that AF=B is sparse when A is an annihilation operator, and A operates on circulant F in such a manner that AF=B is almost everywhere a locally constant matrix when A is a flattening operator; and (c) back-solving Ar=q to determine r=Fp.

To better appreciate the advantages of the present invention over conventional convolution methods, we next explain two types of conventional convolution methods: Fourier-based convolution and wavelet-based convolution.

As is well known, Fourier-based convolution relies on the elegant fact that if F is a Fourier matrix, say $$F_{jk}=e^{-2\pi ijk/N}$$

then the transformation $FDF^{-1}$ of the circulant is diagonal, whence we compute:

$$Dp=F^{-1}(FDF^{-1})Fp,$$

where the far-right operation Fp is the usual Fourier transform, the operation by the parenthetical part is (by virtue of diagonality) dyadic multiplication, and the final operation $F^{-1}$ is the inverse Fourier transform. For arbitrary D one requires actually three Fourier transforms, because the creation of the diagonal matrix $FDF^{-1}$ requires one transform. However, if D is fixed, and transformed on a one-time basis, then subsequent convolutions Dp only require two transforms each, as is well known. The complexity then of Fourier-based cyclic convolution is thus O(N log N) operations (i.e., on the order of N log N multiplications and additions) for convolving a pattern p of length N (a pattern determined by N data values), because of the 2 or 3 FFTs (Fast Fourier Transforms) required. It should be noted that the Fourier method is an exact method (up to round-off errors depending on the FFT precision).

Another class of conventional convolution methods consists of wavelet convolution methods, which, by their nature, are generally inexact. The idea underlying such methods is elegant and runs as follows in the matrix-algebraic paradigm. Assume that, given an N-by-N circulant D, it is possible to find a matrix W (this is typically a compact wavelet transform) which has the properties:

(1) W is unitary (i.e. $W^{-1}$ is the adjoint of W);
(2) W is sparse; and
(3) $WDW^{-1}$ is sparse, where "sparse" in the present context denotes simply that any matrix-vector product Wx, for arbitrary x, involves reduced complexity O(N), rather than say O($N^2$).

With the assumed properties, we can calculate:

$$Dp=W^{-1}(WDW^{-1})Wp$$

by way of three sparse-matrix-vector multiplications, noting that unitarity implies the sparseness of $W^{-1}$. Therefore the wavelet-based convolution complexity is O(N) for convolving a pattern p determined by N data values, except that it is generally impossible to find, for given circulant D, a matrix W that gives both sparsity properties rigorously. Typically, if the convolution kernel d is sufficiently smooth, then a wavelet operator W (which is sparse) an be found such that within some acceptable approximation error the property (3) above holds. Above-noted properties (1) and (2) are common at least for the family of compact wavelets (it is property (3) that is usually approximate).

An advantage of "spline" convolution (in accordance with the teaching of U.S. application Ser. No. 09/480,908) over conventional wavelet convolution is that it can be performed (on data indicative of a pattern p comprising N data values) with cN arithmetic operations, whereas conventional wavelet convolution on the same data would require bN arithmetic operations, where (assuming typical error budgets) the factor "b" is significantly larger than the factor "c." Among the other important advantages of the "spline" convolution method of application Ser. No. 09/480,908 (over conventional convolution methods) are the following: spline convolution is exact with respect to the spline kernel f, whereas wavelet convolution schemes are approximate by design (and error analysis for wavelet convolution is difficult to implement); the signal lengths for signals to be convolved by spline convolution are unrestricted (i.e., they need not be powers of two as in some conventional methods, and indeed they need not have any special form); and spline convolution allows acyclic convolution without padding with zeroes.

Separated-spline convolution in accordance with the present invention (like spline convolution in accordance with U.S. application Ser. No. 09/480,908) is an O(N) method for convolving a pattern p determined by N data values. Separated-spline convolution in accordance with the present invention has an advantage over spline convolution in accordance with U.S. application Ser. No. 09/480,908 in that separated-spline convolution in accordance with the invention can be performed (on data indicative of a two- or higher-dimensional patterns consisting of N data values) with dN arithmetic operations (multiplications and additions), whereas spline convolution in accordance with U.S. application Ser. No. 09/480,908 on the same data would require cN arithmetic operations, where the factor "c" is larger, and typically significantly larger, than the factor "d." In other words, the implied big-O constant for separated-spline convolution according to the present invention is significantly smaller than the typical implied big-O constant for spline convolution as described in U.S. patent application Ser. No. 09/480,908.

SUMMARY OF THE INVENTION

In a class of embodiments, the invention is a method for performing two-dimensional cyclic or acyclic convolution of an n-dimensional pattern "p" (i.e., data indicative of an n-dimensional pattern "p"), where $n \geq 2$, with a smooth diffusion kernel d, to generate data indicative of the convolution result $$r = Dp = d \times p,$$

where D is the circulant matrix (sometimes referred to herein as the "circulant") of d, and "×" denotes convolution. A two-dimensional pattern p is determined by a continuous two-dimensional range of data values or two-dimensional array of discrete data values. In typical discrete implementations, the pattern p is two-dimensional in the sense that it is determined by a discrete, ordered set of data values (e.g., pixels) $p_{ij}$, where i varies from 0 to N−1 and j varies from 0 to N'−1. Where the pattern p has dimension greater than two, it is determined by a three or higher-dimensional set of data values. Typically, the kernel d is determined by an array of data values $d_{ij}$, where i varies from 0 to N−1 and j varies from 0 to N'−1.

In preferred embodiments, the inventive method for performing the convolution $r = Dp = d \times p$, where d is well approximated by (or equal to) a separated-spline kernel, includes the steps of:

(a) specifying the separated-spline kernel as $k(x_1, \ldots, x_n) = k_1(x_1) k_2(x_2) \ldots k_n(x_n)$, where k admits of an operator $A = A_1 A_2 \ldots A_n$, n is the dimension of pattern p, and $A_j$ is an annihilation or flattening operator which operates on the circulant $K_j$ of kernel $k_j$ in such a manner that $A_j K_j$ is sparse (when $A_j$ is an annihilation operator) or $A_j K_j$ is almost everywhere a locally constant matrix (when $A_j$ is a flattening operator);

(b) calculating $q_1 = A_1 k_1 \times p$ for each row of the pattern p;

(c) backsolving $A_1 r_1 = q_1$ for said each row of the pattern to determine $r_1 = k_1 \times p$ for the pattern, by performing a preliminary ignition step in which a small number of components of $r_1$ are computed directly, and then determining the rest of the components of $r_1$ using a natural recurrence relation determined by the operator $A_1$;

(d) transposing $r_1 = k_1 \times p$ generated in step (c), to generate $r_1^T = (k_1 \times p)^T$ for the pattern, and calculating $q_2 = A_2 k_2 \times r_1^T = A_2 k_2 \times (k_1 \times p)^T$ for each row of $(k_1 \times p)^T$;

(e) back-solving $A_2 r^T = q_2$ for said each row of $(k_1 \times p)^T$ to determine $r^T = (k_2 \times k_1 \times p)^T$ for the pattern.

In the case that pattern p is two-dimensional (n=2), the result of step (e) is typically transposed to generate data indicative of $r = (k_2 \times k_1 \times p)$, where the result r is exactly equal to k×p, which is a close approximation to the desired convolution r=Dp.

Where p is an n-dimensional pattern for which n>2, steps (d) and (e) are iterated, in the sense that they are repeated for each for each additional dimension (with $q_i = A_1 k_1 \times q_{i-1}$ being calculated for the i-th dimension during the i-th iteration), and the transposition of the result of the final repetition of step (e) is exactly equal to k×p, which is a close approximation to the desired convolution r=Dp. For an n-dimensional array M (having axes $i_1, i_2, \ldots, i_n$), the multidimensional transposition is defined as $(M^{i_1 i_2 \cdots i_n})^T = M^{i_2 i_3 \cdots i_n i_1}$.

In some implementations of step (c), a small number of the lowest components of $r_1$ are computed directly during the preliminary ignition step, and the rest of the components of $r_1$ are then determined using the natural recurrence relation. In preferred implementations of step (c), a small number of large negative components of $r_1$ are computed directly during the preliminary ignition step, and the rest of the components of $r_1$ are then determined using the natural recurrence relation.

In cases in which the kernel d is itself a separated-spline kernel (so that d=k, and K=D), the method yields an exact result (r=Dp). Otherwise, the error inherent in the method is (k−d)×p, and thus the error is bounded easily.

In one class of preferred embodiments in which pattern p is two-dimensional, the two dimensional kernel is defined as $k(x,y) = k_1(x) k_1(y)$, where $$k_1(x) = (R^2 - x^2) \quad \text{for } |x| \leq R,$$
$$k_1(x) = cd^{-|x|} \quad \text{for } |x| > R.$$

The one-dimensional kernel $k_1(x)$ has three parts:

$$k_1(x) = k_c(x) + k_+(x) + k_-(x),$$

where $k_c(x)$ is a kernel, $$k_c(x) = (R^2 - x^2) \quad \text{for } |x| \leq R$$
$$= 0 \quad \text{for } |x| > R,$$

$k_+(x)$ is a one-tailed Laplacian kernel, $$k_+(x) = cd^{-|x|} \quad \text{for } |x| > R$$
$$= 0 \quad \text{for } |x| \leq R,$$

and $k_-(x)$ is a one-tailed Laplacian kernel, $$k_-(x) = cd^x \quad \text{for } |x| < -R$$
$$= 0 \quad \text{for } |x| \geq R.$$

Each one-dimensional convolution is performed in three parts. The cap (where $|x| \leq R$) and the two decay regions (where x>R and x<−R) are each produced by different convolutions, whose results are added together to obtain the final result.

More specifically, in the noted class of embodiments, the inventive method accomplishes the convolution r=d×p, where p is a two-dimensional pattern and d is a kernel that is well approximated by (or equal to) a separated-spline kernel, by performing the steps of:

(a) specifying the separated-spline kernel as $k(x, y)=k_1(x)k_1(y)$, where $k_1(x)$ is defined in the previous paragraph;

(b) computing a cap convolution $k_c \times p(x)$ for each row of the pattern p, a second convolution $k_+ \times p(x)$ for said each row, and a third convolution $k_- \times p(x)$ for said each row, and adding together the cap convolution, the second convolution, and the third convolution for said each row to generate data indicative of $$q_1=k_1 \times p=(k_c \times p)+(k_+ \times p)+(k_- \times p), \text{ wherein}$$

the cap convolution is accomplished by computing $A_c k_c \times p$ for said each row, where $A_c$ is an annihilation operator defined as $A_c k_c(x)=k_c(x+3)-3k_c(x+2)+3k_c(x+1)-k_c(x)$, and computing $A_c^{-1}(A_c k_c \times p)(x)=k_c \times p(x)$ using the recursion relation $$k_c(x+3)=A_c k_c(x)+k_c(x)+3k_c(x+2)-3k_c(x+1),$$

the second convolution is accomplished by computing $A_+ k_+ \times p(x)$, for said each row, where $A_+$ is an annihilation operator defined as $A_+ k_+(x)=k_+(x+1)-d^{-1}k_+(x)$, and computing $A_+^{-1}(A_+ k_+ \times p)(x)=k_+ \times p(x)$ using the recursion relation:

$$(k_+ \times p)(x+1,y)=(A_+ k_+ \times p)(x,y)+d^{-1}(k_+ \times p)(x,y),$$

and the third convolution is accomplished by computing $A_- k_- \times p(x)$, for said each row, where $A_-$ is an annihilation operator defined as $A_- k_-(x)=k_-(x-1)-d^{-1}k_-(x)$, and computing $A_-^{-1}(A_- k_- \times p)(x)=k_- \times p(x)$ by recursing from the end to the beginning using the recursion relation:

$$(k_- \times p)(x-1,y)=(A_- k_- \times p)(x,y)+d^{-1}(k_- \times p)(x,y);$$

(c) transposing $(k_1 \times p)$ to generate $(k_1 \times p)^T$;

(d) repeating step (b), this time on rows of $(k_1 \times p)^T$ rather than on rows of p, thereby convolving all columns of $k_1 \times p$ with $k_1$; and (e) transposing the result of step (d) to generate data indicative of $r=k \times p$.

Typically, the pattern p(x,y) is stored in a memory prior to step (b), each iteration of step (b) is performed on a different row of the pattern p(x,y) read from the memory, and step (c) includes the step of storing $(k_1 \times p)^T$ in the memory such that each row of $(k_1 \times p)^T$ occupies the memory locations formerly occupied by a corresponding row of p(x,y). Optionally, the final step (step (e)) is omitted.

In another class of preferred embodiments in which pattern p is two-dimensional, the two-dimensional kernel is defined as $$k(x, y) = k_2(x)k_2(y), \text{ where}$$
$$k_2(x) = 2\cos^2(\pi x/(2R)) \quad \text{for } |x| \le R$$
$$= 0 \qquad \text{for } |x| > R.$$

The one-dimensional kernel $k_2(x)$ has two parts:

$$k_2(x)=k_c(x)+k_1(x),$$

where $k_c(x)$ is a kernel $$k_c(x) = 2\cos(\pi x/2) \quad \text{for } |x| \le R$$
$$= 0 \qquad \text{for } |x| > R,$$

and $k_1(x)$ is $$k_1(x) = 1 \quad \text{for } |x| \le R$$
$$= 0 \quad \text{for } |x| > R.$$

More specifically, in the embodiments in which $k(x,y)=k_2(x)k_2(y)$ with $k_2(x)$ as defined in the previous paragraph, the inventive method for performing the convolution $r=d \times p$, where d is well approximated by (or is equal to) a separated-cosine kernel, includes the steps of:

(a) specifying the separated-cosine kernel as $k(x, y)=k_2(x)k_2(y)$;

(b) for each row of the pattern p(x,y), performing the following two steps:
(i) computing values $Ak_2 \times p$ for said each row, for $-R-3 \le x \le n-1$, as follows: $Ak_2(x) \times p(x)=2 \sin^2(\pi/2L)(p(x+R)+p(x+R+1)-p(x-R)-p(x-R+1))$; and
(ii) performing a recursion operation, using the recursion relation $r(x+2)=Ar(x)+2 \sin^2(\pi/2L)(r(x+1)-r(x))+r(x-1)$, and using the relations $r(-R-4)=r(-R-3)=r(-R-2)=0$ to ignite said recursion operation, to find $r(x)=A^{-1}(Ak_2 \times p)$ for said each row, thereby producing, at the end of a final iteration of step (ii), data indicative of $k_2 \times p$;

(c) transposing $k_2 \times p$ to produce $(k_2 \times p)^T$; and (d) repeating step (b), this time on rows of $(k_2 \times p)^T$ rather than rows of p, thereby convolving all columns of $k_2 \times p$ with $k_2$.

Preferably, steps (a)–(d) are performed by an appropriately programmed processor, and the processor performs the additional step of: (e) after step (d), transposing the result of step (d) to produce r(x,y), and returning to an initial processor state. In variations on the embodiments in this class, each occurrence of the factor $2 \sin^2(\pi/2L)$ is replaced by the factor 1.

In other embodiments, the invention is a computer programmed with software for performing convolution, on data indicative of an n-dimensional pattern (where n is greater than or equal to 2), using a separated kernel in accordance with any embodiment of the inventive method. Other embodiments of the invention include a digital signal processor including digital signal processing circuitry configured to perform convolution on data indicative of an n-dimensional pattern (where n is greater than or equal to 2), using a separated kernel in accordance with any embodiment of the inventive method, an apparatus (such as custom or dedicated electronic circuitry, or a field programmable gate array based computing system ("FPGA system")) configured to perform convolution on such data in accordance with any embodiment of the inventive method, and a lithography system including such digital signal processing circuitry, such custom or dedicated electronic circuitry, or such an FPGA system.

Also within the scope of the invention is a computer-readable storage medium which stores computer-executable instructions, wherein the instructions are such that a computer performs an embodiment of the inventive method in response to executing the instructions.

DETAILED DESCRIPTION OF THE PREFERRED EMBODIMENTS

Figure 1:
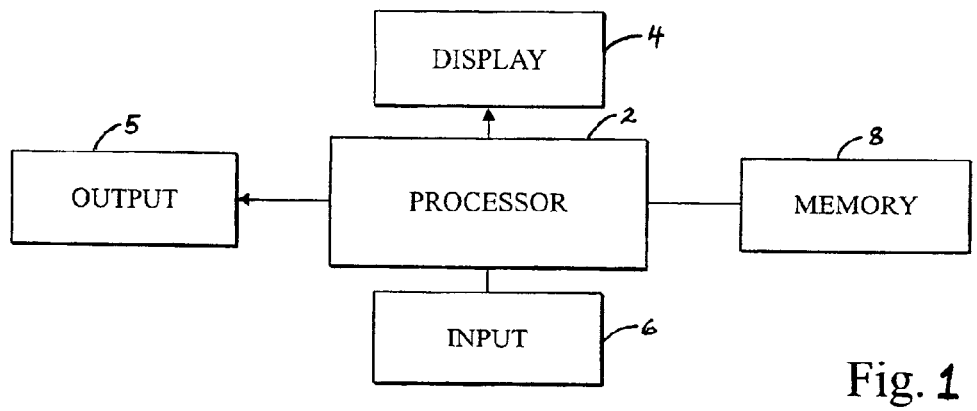
FIG. 1 is a block diagram of a computer system programmed with software for implementing the inventive method.

Throughout the disclosure, including in the claims, the term "data" denotes one or more signals indicative of data words. Thus, the statement that data indicative of a pattern "p" is convolved (in accordance with the invention) with data indicative of a smooth kernel "d" denotes that one or more signals indicative of the pattern p is (are) processed with another set of one or more signals indicative of the kernel d, to generate data (i.e., one or more signals) indicative of the convolution result.

Preferred embodiments of the invention will be described with reference to "annihilation" and "flattening" operators.

We initially provide heuristic motivation for the theory of separation. The theory of spline convolution is based on the premise that we begin with a piecewise kernel, each of whose regions is annihilated by an operator, A. We then perform a convolution of the pattern with Ak. Since A annihilates each region of the kernel, the convolution is really with the boundary of the kernel's regions. Thus for a dimension d convolution, Ak is in some sense a (d−1)-dimensional kernel. For example, consider the kernel:

$$k(x, y) = a\left(r_0^4 - 2r_0^2(x^2 + y^2) + (x^2 + y^2)^2\right) \text{ for } x^2 + y^2 \le r_0^2$$
$$= 0 \qquad\qquad\qquad \text{ for } x^2 + y^2 > r_0^2.$$

When this kernel is annihilated, its boundary is a ring at $r_0$, generated by the discontinuity of k. The non-zero area of Ak is linear in $r_0$, and this is what is meant when we say that it is of "dimension" d−1.

It is for this reason that convolution in accordance with the invention employs separated kernels. The basic premise is that, in order to perform two-dimensional convolution in accordance with the invention, one "factors" the separated kernel and performs two one-dimensional convolutions. These convolutions are not dependent on the radius, and in practice this technique will reduce the number of convolution operations drastically.

Assume that we have a two-dimensional kernel, k(x,y), that can be expressed as:

$$k(x,y)=k_x(x)k_y(y).$$

If this is so, then given a pattern, p, we can express the result of the convolution as:

$$r(x, y) = \sum_i k_x(x - i) \sum_j k_y(y - j) p(i, j).$$

But notice that $$p_y(y, j) = \sum_j k(y - j) p(i, j)$$

is the column-by-column convolution of p with $k_y$. To get the convolution result in accordance with the invention, we determine $p_y$(yj) then convolve this with $k_x$ along the rows. As the following examples will show, this convolution is characterized by only a few operations per pixel.

What follows are two examples of separated-spline convolution implemented in accordance with the invention. These examples were selected to showcase the polynomial, Laplacian, and trigonometric spline techniques.

EXAMPLE 1

Quadratic with Laplacian Decay Separated Kernel

The one-dimensional kernel for this algorithm is defined as:

$$k_1(x) = a(b^2 - x^2) \text{ for } |x| \le R,$$
$$k_1(x) = cd^{-|x|} \qquad \text{for } |x| > R.$$

One may assert that $a(b^2-R^2)=cd^{-R}$ to achieve continuity.
The two dimensional kernel is defined as:

$$k(x,y)=k_1(x)k_1(y). \qquad (1)$$

Each one-dimensional convolution is performed in three parts. The cap (where $|x| \le R$) and the two decay regions (where x>R and x<−R) are each produced by different convolutions, whose results are added together to obtain the final result.

The one-dimensional cap convolution, using the kernel $$k_c(x) = a(b^2 - x^2) \text{ for } |x| \le R$$
$$= 0 \qquad \text{ for } |x| > R,$$

is accomplished as follows. We choose an annihilation operator $A_c$ of the form $$A_c k_c(x) = e k_c(x+i) + f k_c(x+j) + g k_c(x+m) + h k_c(x+n),$$

where e, f, g, h, i, j, m, and n are integers.

With appropriately chosen values of e, f, g, h, i, j, m, and n, $A_c k_c(x)$ will be zero except at a small number of specific values of the parameter x. Thus, to compute $(A_c k_c \times p)$ for each value of x, one need only compute a small number of additions (and an even smaller number of additions near the boundaries of the interval over which the convolution is performed). After computing $(A_c k_c \times p)(x)$ for each value of x, a recursion relation is employed to compute $A_c^{-1}(A_c k_c \times p)(x)=r(x)$. In typical implementations, a small number of initial values of $A_c^{-1}(A_c k_c \times p)(x)$ are found by direct computation to "ignite" the recursion relation calculation.

Consider the case that the parameters "a" and "b" in $k_c(x)$ satisfy a=1 and b=R. In this case, we choose the annihilation operator $A_c$ to be $$A_c k_c(x) = k_c(x+3) - 3k_c(x+2) + 3k_c(x+1) - k_c(x).$$

With this operator $A_c$, $A_c k_c(x)$ will be zero except at four values of x: x=−2R+1, x=2R+1, x=2R−1, and x=−2R−1. Thus, to compute $(A_c k_c \times p)(x)$ for each value of x, one need only compute seven additions (and an even smaller number of additions near the boundaries of the interval over which the convolution is performed). The recursion relation employed to compute $A_c^{-1}(A_c k_c \times p)(x) = r(x)$ is determined by rewriting the equation that defined $A_c$ in the form $$k_c(x+3) = A_c k_c(x) + k_c(x) + 3k_c(x+2) - 3k_c(x+1),$$

and recursively solving for x. The final difficulty is that we need three initial values of $k_c$ to do this. There are two solutions to this problem of "igniting" the convolution. First, we can solve for the values $\{r(0), r(1), r(2)\}$ via direct computation, which takes 3(2R−2) multiplies and 3(2R−3) adds. Otherwise, we could note that r(x) must be zero for x less than −R, since these points lie beyond the kernel radius away from the pattern. Thus we know that r(−R−2), r(−R−1), and r(−R) are all zero. We can then recurse to find $\{r(0), r(1), r(2)\}$ and thus ignite the convolution. The latter procedure requires 3(R+2) adds and (R+2) multiplies, so in this case, the second approach is far more economical. There are other cases in which the second approach will be less economical than the first approach.

The one-dimensional convolution for the positive decay region is performed using the one-tailed Laplacian decay kernel, $$k_+(x) = cd^{-|x|} \quad \text{for } |x| > R,$$
$$k_+(x) = 0 \quad \text{for } |x| \leq R.$$

which is annihilated by the simple annihilation operator $A_+$:

$$A_+ k_+(x) = k_+(x+1) - d^{-1} k_+(x).$$

Notice that $A_+ k_+(R) = cd^{-R}$ while $A_+ k_+(R) = 0$ otherwise. This is just a pattern translation and scale, while the recursion is as simple as can be:

$$r(x+1) = (A_+ k_+ \times p)(x) + d^{-1} r(x).$$

An interesting point about this decay kernel is that it can be ignited in the region of the result. That is, we know that r is zero for all x less than R. So we fill the first R values with zeroes, then the spline actually begins.

The one-dimensional convolution for the negative decay region is exactly the same as the one-dimensional convolution for the positive decay region, except that the recursion should be taken in the opposite direction. This slows the algorithm, since the $k_c$ and $k_+$ convolutions can be calculated on a single pass of the pointers, but the $k_-$ convolution requires a second, reversed pass.

What follows is one algorithm for implementing the above-mentioned two-dimensional convolution as a separated-spline convolution in accordance with the invention. For the algorithm statement, we will need the following definitions. The $k_-$ kernel is $$k_-(x) = cd^x \quad \text{for } |x| < -R$$
$$= 0 \quad \text{for } |x| \geq R,$$

and its annihilator $A_-$ is:

$$A_- k_-(x) = k_-(x-1) - d^{-1} k_-(x).$$

The algorithm takes as an input a pattern p(x,y) for (x,y) $\in$ D, with D being a rectangular domain of given size. It returns r(x,y) = (k×p)(x,y) for all points in D, where k(x,y) is defined in equation (1) above. We ask in this instance that the size of D be fixed only because, due to the nature of the Laplacian decay, the optimal "constants" describing k are dependent on the width and height of D. Note that the algorithm computes the convolution by treating k(x,y) as $$k(x,y) = (k_c + k_+ + k_-)(x)(k_c + k_+ + k_-)(y) = k_1(x) k_1(y).$$

The algorithm is presented in a non-optimized manner so that can be more easily understood. It is important to realize that with floating point arithmetic, there will most likely be catastrophic, chaotic behavior on the polynomial convolution, so this must be done with fixed-point numbers.

The algorithm, to be referred to as "Algorithm for Quadratic with Laplacian decay separated-spline convolution," is:

(a) Loop over the rows. For each row, compute the convolution of the row with $k_1(x)$ by computing a cap convolution (step i), a positive decay convolution (step ii), and a negative decay convolution (step iii) on the row, adding together (step iv) the three convolutions produced in steps (i), (ii), and (iii) for said row. One repetition of steps (i), (ii), (iii), and (iv) is performed as follows for each row of the pattern:

(i) Compute the $k_c$ convolution:

compute $(A_c k_c \times p)(x)$, an annihilated kernel convolved with said row of the pattern, where $A_c$ is as defined above; and compute $A_c^{-1}(A_c k_c \times p)(x,y))$ using the above-described recursion relation, which is: $k_c(x+3) = A_c k_c(x) + k_c(x) + 3k_c(x+2) - 3k_c(x+1)$, in the case that that the parameters "a" and "b" in $k_c(x)$ satisfy a=1 and b=R;

(ii) Compute the $k_+$ convolution:

compute $(A_+ k_+ \times p)(x)$, an annihilated kernel convolved with said row of the pattern, where $A_+$ is as defined above. Realize that this is a trivial calculation, since $(A_+ k_+ \times p)(x,y) = cd^R p(x-R, y)$; and compute $A_+^{-1}(A_+ k_+ \times p)(x,y))$ using the recursion relation:

$$(k_+ \times p)(x+1, y) = (A_+ k_+ \times p)(x,y) + d^{-1}(k_+ \times p)(x,y)$$

(iii) Compute the $k_-$ convolution:

compute $(A_- k_- \times p)(x)$, an annihilated kernel convolved with said row of the pattern, where $A_+$ is as defined above. Realize that this is a trivial calculation, since $(A_- k_- \times p)(x,y) = cd^{-R} p(x+R, y)$; and compute $A_-^{-1}(A_- k_- \times p)(x,y))$ by recursing from the end to the beginning using the recursion relation:

$$(k_- \times p)(x-1, y) = (A_- k_- \times p)(x,y) + d^{-1}(k_- \times p)(x,y);$$

(iv) Add the results of steps (i), (ii), and (iii) for said row of the pattern, thereby producing at the end of the last iteration of step (iv), data indicative of $k_1 \times p = (k_c \times p) + (k_+ \times p) + (k_- \times p)$;

(b) Transpose $k_1 \times p$ to produce $(k_1 \times p)^T$;

(c) Repeat step (a), this time on rows of $(k_1 \times p)^T$ rather than on rows of p, thereby convolving all columns of $k_1 \times p$ with $k_1$;

(d) transpose the result of step (c) to produce r(x,y), and return.

Typically, the pattern p(x,y) is stored in a memory prior to step (a), each iteration of step (i) is performed on a different row of the pattern p(x,y) read from the memory, and step (b) includes the step of storing $(k_1 \times p)$ in the memory, such that each row of $(k_1 \times p)^T$ occupies the memory locations formerly occupied by a corresponding row of p(x,y).

Some modifications of the algorithm can be made to increase its speed. For example, in all cases the algorithm is preferably performed by a processor programmed to compute each annihilated convolution and simultaneously inflate it. This way, there is no need to store the annihilated convolution before it is flattened. Also, both $k_+$ and $k_c$ are preferably computed on the same pass through the processor. Also, two full transpositions will typically not be necessary where a column-ferrying technique is employed to compute the cap and positive decay region convolutions, and the column return, negative convolution and add should all be part of the same loop. It is also likely that when employing some types of processors to perform the algorithm, in-place operations are fastest.

Note that as an approximation to the Gaussian, the above-described embodiment of convolution in accordance with the invention is dependent on the size of the pattern since the Laplacian decay is $e^{-x}$ and the Gaussian is $e^{-x^2}$. Thus the error is dependent on the size of the domain.

EXAMPLE 2

Squared Cosine Separated Kernel

We next present another separated-spline kernel (a "squared cosine" separated kernel) and an embodiment of the inventive convolution method which employs the squared cosine separated kernel. Convolution using the squared cosine separated kernel is faster and cleaner than convolution using the above-described "quadratic with Laplacian decay" kernel, since convolution using the squared cosine kernel is independent of the pattern's dimension. The squared cosine kernel also allows a mostly in-place method for the set of row convolutions in one pass, and also a ferrying technique with calculations done on the transfer. Since the squared cosine kernel is more stable, floating point arithmetic can be used. This is true, because in the case of polynomials, an error becomes chaotic as that polynomial, whereas for the squared cosine kernel, a small error becomes small oscillatory noise. If the pattern is in some sense "regular," the noise is expected to be unnoticeable for some (very small) level of precision. We define the one-dimensional squared cosine kernel as:

$$k_2(x) = 2\cos^2(\pi x / 2R) \quad \text{for } |x| \le R$$
$$= 0 \quad \text{for } |x| > R.$$

The two dimensional kernel is defined as:

$$k(x,y) = k_2(x) k_2(y). \quad (2)$$

As before, we will write the kernel $k_2(x)$ as the sum of two kernels. The first of these is:

$$k_c(x) = 2\cos(\pi x / R) \quad \text{for } |x| \le R$$
$$= 0 \quad \text{for } |x| > R.$$

The other kernel is $$k_i(x) = 1 \quad \text{for } |x| \le R$$
$$= 0 \quad \text{for } |x| > R.$$

For these two kernels, it is true that $k_2(x) = k_c(x) + k_i(x)$. The kernel $k_i$ is easily annihilated by the discrete derivative which we will call $A_i$ for notational continuity. This annihilation operator's explicit definition is $$A_i f(x) = f(x+1) - f(x).$$

Annihilating the cosine, $k_c$ is less straightforward, but if one notices that $$\cos(\pi(x+1)/L) + \cos(\pi(x-1)/L = 2(\cos \pi x/L)(\cos \pi/L),$$

it is apparent that if we define operator $A_c$ by:

$$A_c f(x) = f(x+1) + f(x-1) - 2(\cos \pi/L) f(x),$$

then $k_c$ is annihilated by $A_c$. The annihilation operator A that we will use is the "product" of these two operators:

$$A f(x) = A_c \circ A_i f(x) = f(x+2) - (1+2 \cos \pi/L)(f(x+1) - f(x)) - f(x-1)$$

A can be seen to annihilate $k_2$, since $A k_2 = A_i \times A_c k_2$ which is just $A_i$ acting on something that has been annihilated, and the same can be said for $A k_1$. Computation shows that the non-zero values of Ak are:

$$Ak_2(-R-1) = 2\sin^2(\pi/2L)$$
$$Ak_2(-R) = 2\sin^2(\pi/2L)$$
$$Ak_2(R-1) = -2\sin^2(\pi/2L)$$
$$Ak_2(R) = -2\sin^2(\pi/2L)$$

We next present an algorithm for convolution of k(x,y), determined by the above-described squared cosine kernel $$k_2(x) k_2(y) = (k_c(x) + k_i(x))(k_c(y) + k_i(y))$$

with a pattern, p(x,y), to compute r(x,y) in accordance with the invention. This will be very similar to the above-described algorithm for convolution using the above-defined "quadratic with Laplacian decay" kernel. The algorithm, to be referred to as "Algorithm for squared cosine separated-spline convolution," is:

(a) Loop over the rows. For each row of the pattern p(x,y), compute the convolution of said row with $k_2(x)$. This is done via a one dimensional spline convolution including the steps:

(i) compute the values $Ak_2(x) \times p(x)$ for said row, for $-R-3 \le x \le n-1$, as follows $Ak_2(x) \times p(x) = 2 \sin^2(\pi/2L)(p(x+R) + p(x+R+1) - (p(x-R) - p(x-R+1));$ (ii) use the relations $r(-R-4) = r(-R-3) = r(R-2) = 0$ to ignite a recursion operation to find r(x) for the row, via the recursion relation $r(x+2) = Ar(x) + (1+2 \cos \pi/L)(r(x+1) - r(x)) + r(x-1)$, thereby producing, at the end of the last iteration of step (ii), data indicative of $k_2 \times p$;

(b) Transpose $k_2 \times p$ to produce $(k_2 \times p)^T$;

(c) Repeat step (a), this time on rows of $(k_2 \times p)^T$ rather than on rows of $p(x,y)$, thereby convolving all columns of $k_2 \times p$ with $k_2$.

Preferably, a final step of transposing the result of step (c) is performed to produce $r(x,y)$, and the processor then returns to its initial state.

Typically, the pattern $p(x,y)$ is stored in a memory prior to step (a), each iteration of step (i) is performed on a different row of the pattern $p(x,y)$ read from the memory, and step (b) includes the step of storing $(k_2 \times p)^T$ in the memory, such that each row of $(k_2 \times p)^T$ occupies the memory locations formerly occupied by a corresponding row of $p(x,y)$.

The naive computation count for the described algorithm is as follows: there are h repetitions of step (a), where h is the height; computing Ak involves one multiplication and three adds, done w+R+3 times (where w is the width); the recursion requires one multiplication and four adds done w+R+3 times (where w is the width). Therefore, the entire algorithm on a square $\sqrt{N}$ by $\sqrt{N}$ array requires:

$$4(N+R\sqrt{N}+3)$$

multiplies and $$7(N+R\sqrt{N}+3)$$

adds. This can be optimized in a couple of ways. First, one can normalize in the final stage, and let Akxp be computed as $p(x+R)+p(x+R+1)-(p(x-R)-p(x-R+1))$. This saves $N+2\sqrt{N}+6$ multiplies, which would significantly reduce computational costs. Second, all of the multiplies are by the same two fixed numbers, so that this can be optimally hard-coded. Third, and most importantly, is that since this process works on rows independently, it is very easily parallelizable and also vectorizable. The number of adds can also be reduced, but this will typically not significantly affect the computation time.

More generally, in a class of preferred embodiments, the inventive method for performing the convolution $r=Dp=d \times p$ (with × denoting the convolution), where d is well approximated by (or equal to) a separated-spline kernel, includes the steps of:

(a) specifying the separated-spline kernel as $k(x_1, \ldots, x_n)=k_1(x_1)k_2(x_2)) \ldots k_n(x_n)$, where k admits of an operator $A=A_1 A_2 \ldots A_n$, where $A_j$ is an annihilation or flattening operator that operates on circulant $K_j$ of kernel $k_j$ in such a manner that $A_j K_j = B_j$ is sparse (when $A_j$ is an annihilation operator) or $A_j K_j = B_j$ is almost everywhere a locally constant matrix (when $A_j$ is a flattening operator) and n is the dimension of pattern p;

(b) calculating $q_1 = B_1 p = A_1 k_1 \times p$ for each row of the pattern p;

(c) backsolving $A_1 r_1 = q_1$ for each said row of the pattern to determine $r_1 = k_1 \times p$ for said pattern, by performing a preliminary ignition step in which a small number of components of $r_1$ are computed directly, and then determining the rest of the components of $r_1$ using a natural recurrence relation determined by the operator $A_1$;

(d) transposing $r_1 = k_1 \times p$ generated in step (c), to generate $r_1^T = (k_1 \times p)^T$ for the pattern, and calculating $q_2 = B_2 r_1^T = A_2 k_2 \times (k_1 \times p)^T$ for each row of $(k_1 \times p)^T$; and (e) backsolving $A_2 r^T = q_2$ for said each row of $(k_1 \times p)^T$ to determine $r_2^T = (k_2 \times k_1 \times p)^T$ for the pattern.

In the case that pattern p is two-dimensional (n=2), the result of step (e) is typically transposed to generate data indicative of $r=(k_2 \times k_1 \times p)$, and the result r is a close approximation to the desired convolution Dp. Where n>2, steps (d) and (e) are repeated for each additional dimension of pattern p (with the transposition operation as defined above in the Summary), and the transposition of the result of the final repetition of step (e) is a close approximation (or exactly equal) to the desired convolution Dp.

In some implementations of step (c), a small number of the lowest components of $r_1$ are computed directly during the preliminary ignition step, and the rest of the components of $r_1$ are then determined using the natural recurrence relation. In preferred implementations of step (c), a small number of large negative components of $r_1$ are computed directly during the preliminary ignition step, and the rest of the components of $r_1$ are then determined using the natural recurrence relation.

In cases in which the kernel d is itself a separated-spline kernel (so that d=k, and K=D), the method yields an exact result (r=Dp). Otherwise, the error inherent in the method is $(k-d) \times p$, and thus the error is bounded easily.

What follows is an example of working source code (in the language C) for a function implementing the separated-spline technique for convolution in accordance with the invention. The kernel specified in the example is the squared cosine kernel discussed above. This function is called by sending pointers to the input pattern (*Pattern), the output array (*Result), and a one-dimensional working buffer (*r). Global variables are the array size, which is NX×NY, and N=max(NX,NY). This code has been optimized to run in minimal memory with few logical clauses. The downside to this is that the simplicity of the algorithm is not readily apparent at first. Notice that most of the code is some variation of the lines:

$$r[x+1] = c2*r[x] - r[x-1] + s;$$

$$s += s2*(q[x+L] + q[x+L+1] - q[x-L] - q[x-L+1]);$$

so that the actual algorithm is conceptually very compact.

Example: C source code for implementation of squared cosine separated-spline convolution:

```
Void
Cossplineconv(float*Pattern, float*Result, float*r) {
    int x,y;
    float*q, *Resultptr, s;
    float c = (float) cos(PI/l), c2 = 2*c, s2 = 1, max, norm;
    for(y=0; y<NY; y++) { /* X direction convolution */
        r[-L-5] = r[-L-4] = 0;
        s = 0;
        q =&pattern[N*y];
        Resultptr = &Result[N*y];
        x = -L-4;
        r[x+1} c2 * r[x] - r[x-1] +s;
s += 0;
x =-L-3
r[x+1] = c2 * r[x] - r[x-1] + s;
s += 0;
x = -L-2;
r[x+1] = c2 * r[x] - r[x-1] + s;
s += 0;
x = -L-1;
r[x+1] = c2 * r[x] - r[x-1] + s;
s += s2*q[x+L+1];
for(x = -L; x < 0; ++x){
    r[x+1] = c2 * r[x] - r[x-1] + s;
    s += s2*(q[x+L] + q[x+L+1]);
}
```

```
-continued for (x = 0; x < L - 1; ++x){
        r[x+1] = c2 * r[x] - r[x-1] + s;
        s += s2*(q[x+L] + q[x+L+1]);
}
x = L - 1;
r[x+1] = c2 * r[x] - r[x-1] + s;
s += s2*(q[x+L] + q[x+L+1] - q[x-L+1]);
for (x = L; x < NX - L - 1; x++) {
        r[x+1] = c2 * r[x] - r[x-1] + s;
        s += s2*(q[x+L] + q[x+L+1] - q[x-L] - q[x-L+1]);
}
x = NX - L - 1;
r[x+1] = c2 * r[x] - r[x-1] + s;
s += s2*(q[x+L] - q[x-L] - q[x-L+1]);
for(x = NX-L; x < NX-1; X++) {
        r[x+1] = c2 * r[x] - r[x-1] + s;
        s -= s2*(q[x-L] + q[x-L+1]);//Note -=.
}
for(x = 0; x < NX; x++)
        Resultptr[x] = r[x];
}
for(x=0; x <NX; x++) {/* Y direction convolution */
        r[-L-5] = r{-L-4] = 0;
        s = 0;
        q = &Result[x];
        Resultptr = &Result[x];
        y = -L-4;
        r[y+1 } = c2 * r[y] - r[y-1] + s;
        s += 0;
        y = -L-3;
        r[x+1] = c2 * r[y] - r[y-1] + s;
        s += 0;
y = -L-2;
r[y+1] = c2 * r[y] - r[y-1] + s;
s += 0;
y = -L-1;
r[y+1] = c2 * r[y] - r[y-1] + s;
s += q[N*(y+L+1)];
for(y = -L; y < 0; ++y){
        r[y+1] = c2 * r[y] - r[y-1] + s;
        s += (q[N*(y+L)] + q[N*(y+L+1)]);
}
for(y = 0; y < L - 1; ++y){
        r[y+1] = c2 *r[y] - r[y-1] + s;
        s += (q[N*(Y+1)] + q[N*(y+L+1)]);
}
y = L - 1;
r[y+1] = c2 *r[y] - r[y-1] + s;
s += (q[N*(y+L)] + q[N*y+L+1)] - q[N*(y-L+1)]);
for(y = L; y < NY - L - 1; y++) {
        r[y+1] = c2 * r[y] - r[y-1] +s;
        s += (q[N*(y+1)] + q[N*(y+L+1)] - q[N*(y-L)] -
        q[N*(y-L+1)]);
}
y = NY - L - 1;
r[y+1] = c2 * r[y] - r[y-1] + s;
        s += (q[N*(y+L)] - q[N*(y-L)] - q[N*(y-L+1)]);
        for(y = NY-L; y < NY-1; y++) {
                r[y+1] = c2 * r[y] - r[y-1] + s;
                s -= (q[N*(y-L)] + q[N*(y-L+1)]);//Note -=
        }
        for(y = 0; y < NY; y++)
                Resultptr[N*y] = r[y];
}
```

In some 2-dimensional implementations of the inventive method, discrete convolution is performed employing a matrix formalism, whereby a 2-dimensional pixel rectangle is converted into a 1-dimensional column vector using lexicographical indexing. In this case the circulant matrix F becomes an NN'-by-NN' monstrosity, but when an annihilation operator A is applied, the operator AF will be sparse. This class of embodiments of the invention has the advantage of converting nonvanishing circular regions to deterministically-indexed matrix elements.

FIG. 1 is a block diagram of a computer system which embodies the invention. The system includes processor 2 (which is programmed with software for implementing any embodiment of the inventive convolution method), display device 4, input device 6, and memory 8 (and optionally also output device 5) coupled to processor 2. Where processor 2 is a typical processor configured to process binary data, it is programmed with software for implementing a "discrete" implementation of the inventive method. Typically, memory 8 stores data indicative of the circulant D of the convolution kernel d, the circulant $K_1$ of factor kernel $k_1$ of the spline kernel $k(x_1, x_2, \ldots, x_n) = k_1(x_1)k_1(x_2)) \ldots k_n(x_n)$, the pattern p to be convolved, intermediate quantities generated during performance of the method, and data indicative of the convolved signal r=Kp resulting from the convolution. In some implementations, processor 2 is programmed to determine (from a user-specified convolution kernel d of interest) particular parameters of a spline kernel k which cause the spline kernel to approximate the convolution kernel d (subject to user-specified constraints). In some implementations, processor 2 generates one or more look-up tables, stores them in memory 8 (or a cache memory associated with processor 2), and then accesses the stored look-up tables during performance of the invention. The user controls processor 2 (including by specifying processing parameters or constraints) using input device 6. Text and images generated by processor 2 (such as representations of a two-dimensional pattern p to be convolved and the convolution result Kp generated in accordance with the invention) are displayed on display device 4. Output device 5 (which can be employed instead of or in addition to display device 4) is preferably a pattern-capable device such as a sound reproduction unit, an I/O port (input/output port), or a signal processing (and/or storage) device (or system).

Figure 2:
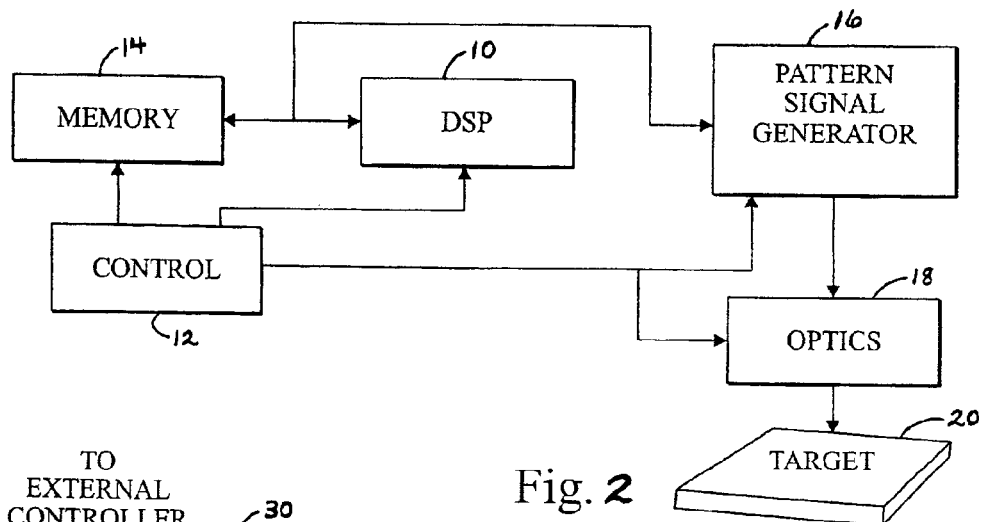
FIG. 2 is a block diagram of a lithography system including a digital signal processor configured to perform convolution (in accordance with the invention) on image data, and a device which generates a pattern signal (e.g., an optical beam electron beam having time-varying amplitude) from the resulting convolved image data. The pattern signal is provided to a set of optics (e.g., reflective or refractive optics, or electron beam optics) and the output of the optics is projected as a pattern on a glass plate, thus producing a mask useful in integrated circuit manufacture.

FIG. 2 is a block diagram of a lithography system including digital signal processor ("DSP") 10 which is configured to perform convolution (in accordance with the invention) on image data stored in memory unit 14. The image data stored in memory unit 14 determines the pattern p to be convolved. DSP 10 processes the image data to generate output data indicative of the convolution result r=Kp. The output data is stored in memory 14 (and optionally undergoes further processing) and/or is output to "pattern signal" generation device 16. Device 16 generates a pattern signal (e.g., a beam of optical or other electromagnetic radiation having time-varying amplitude or an electron beam having time-varying amplitude) in response to data it receives from DSP 10.

In a class of embodiments, device 16 emits a beam of optical radiation which is incident on optics 18 to cause optics 18 to project an output beam on lithography target 20. Optics 18 scans the output beam across lithography target 20, in response to scan control signals from control unit 12. The amplitude of the beam emitted from device 16 varies as a function of time (in response to the output data from DSP 10, which assumes the scan pattern determined by the scan control signals from unit 12) in such a manner that the scanned output beam (the output of optics 18) exposes target 20 to a pattern of pixels.

In other embodiments, device 16 emits an electron beam which is incident on optics 18, to cause optics 18 to project an output electron beam on lithography target 20. Optics 18 scans the output electron beam across target 20, in response to scan control signals from control unit 12. The amplitude of the electron beam emitted from device 16 varies as a function of time (in response to the output data from DSP 10, which assumes the scan pattern determined by the scan control signals from unit 12) in such a manner that the scanned output beam from optics 18 exposes target 20 to a pattern of pixels.

Alternatively, device 16 can emit radiation which is focused (without being scanned) by optics 18 to project on target 20 an image comprising pixels, said image determining a pattern. For example, one embodiment of device 16 emits optical radiation which is focused by optics 18 so as to project from optics 18 as a pattern on target 20, without the need for optics 18 to scan any beam across target 20.

We shall refer to the output of device 16 as a "pattern signal," recognizing that examples of such pattern signal include a beam of optical or other radiation to be scanned by optics 18, an electron beam to be scanned by optics 18, and radiation to be focused by but not scanned by optics 18. Optics 18 can be a set of reflective and/or refractive optics (with or without scanning capability, including means for moving one or more elements of the optics to scan a beam across target 20), or it can be a set of electron beam optics (with scanning capability, including means for moving one or more elements thereof to scan an electron beam across target 20). The output of optics 18 is projected (e.g., including by being scanned) as a pattern on lithography target 20.

Typically, target 20 is a glass plate (so that projection of the pattern thereon produces a mask useful in integrated circuit manufacture) or a semiconductor wafer. Optics 18 typically focuses the pattern signal so that a very small pattern is projected on target 20.

Although the "raw" pattern signal that is output from device 16 determines a pattern, diffraction artifacts (or other artifacts) introduced by optics 18 (or inherent in the interaction between the imaging beam and target 20) may cause the pattern actually produced on target 20 to differ from this pattern. For example, consider the case that the "raw" pattern signal output from device 16 is an electron beam to be focused by electron beam optics 18, and scanned onto a sequence of pixels on target 20, in an effort to project on target 20 a pattern determined by the amplitude of the focused electron beam incident on each single pixel of the sequence. In this case, the well known "proximity problem" (discussed above) causes exposure of an area surrounding each pixel on which the focused electron beam is incident (due to scattering of electrons away from each such pixel to the surrounding areas of the target). As a result, the pattern actually produced on target 20 is determined by superposition of the results of directing the focused electron beam at each pixel of the sequence, where a multi-pixel region is exposed each time the focused electron beam is incident at one of the pixels of the sequence.

Thus, DSP 10 is configured to generate output data which will cause device 16 to output a "raw" pattern signal having the characteristics that are needed to produce a desired pattern on target 20. To accomplish this, DSP 10 performs a deconvolution operation on a large array of pixels (image data stored in memory 14) in order to compensate for any artifacts expected to be introduced by optics 18 and/or any expected scattering (by target 20) of an electron beam incident on target 20 from optics 18. The deconvolution operation performed by DSP 10 includes a convolution operation (performed in accordance with the invention) on stored image data that it retrieves from memory 14, where the image data determines a very large array of pixels which in turn determines a pattern "p". DSP 10 thus processes the image data in accordance with the present invention to generate data indicative of the convolution result $r=Kp$. The latter data is then asserted to device 16, or is further processed prior to assertion to device 16.

Controller 12 of the FIG. 2 system provides appropriate control signals to units 10, 14, 16, and 18, and is capable (for example) of downloading instructions to DSP 10 to cause it to execute the convolution operation with specified parameters.

Figure 3:
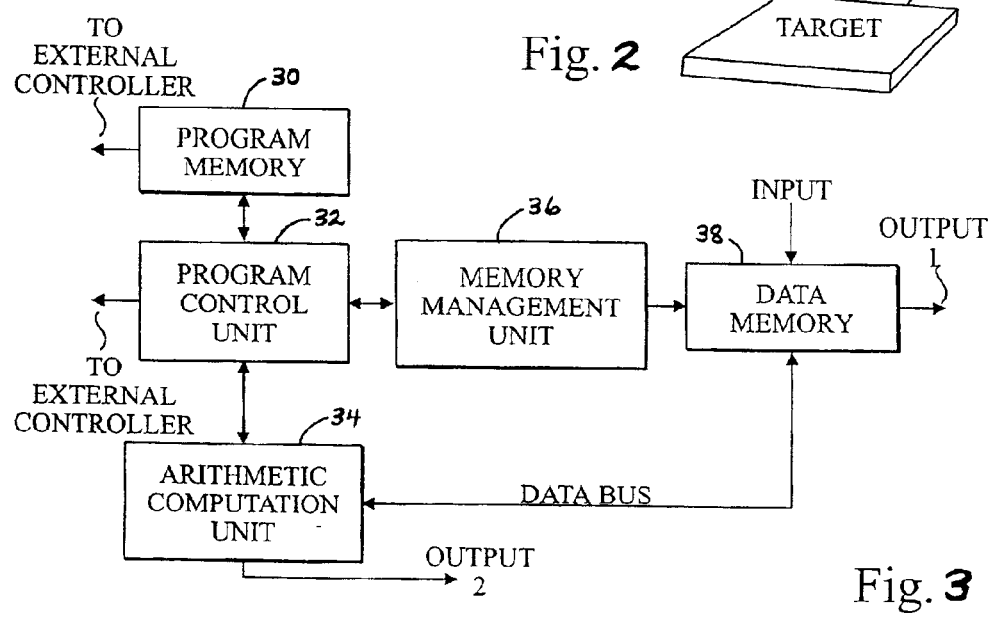
FIG. 3 is a block diagram of a digital signal processor (which can be used as the digital signal processor of FIG. 2) configured to perform convolution (in accordance with the invention) on image data.

FIG. 3 is a block diagram of a digital signal processor (DSP) which can be used as DSP 10 of FIG. 2, and which is configured to perform convolution in accordance with the invention on image data. The DSP of FIG. 3 includes arithmetic computational unit (ACU) 34 which includes addition and multiplication circuitry (for performing the matrix multiplication and recurrence relation operations required to implement the convolution), program memory 30 (which stores the instructions which are executed by the DSP to perform the convolution operation), program control unit (PCU) 32, memory management unit 36, and data memory 38, connected as shown. In response to commands from a user, controller 12 of FIG. 2 loads appropriate instructions into memory 30, and data indicative of a pattern p (the data labeled "INPUT" in FIG. 3) is loaded into memory 38.

PCU 32 includes instruction fetch circuitry for fetching a sequence of the instructions from program memory 30, instruction decoding circuitry, and registers for storing control bits generated by the decoding circuitry for assertion at appropriate times to unit 36 and/or unit 34.

Memory management unit 36 is configured to generate address signals (each identifying a memory location in memory 38 for writing data to or reading data from) in response to control bits from PCU 32, and to assert such address signals over an address bus to memory 38. Thus, in response to control bits from PCU 32 (which have been generated in PCU 32 by decoding instructions from program memory 30), unit 36 asserts address signals to data memory 38.

In response to the addresses asserted by memory management unit 36, data memory 38 sends signals indicative of data to ACU 34 (over a data bus). The resulting output signals from ACU 34 (indicative of partially processed data, or of the final convolution result, $r=k\times p$, can propagate over the data bus to memory 38 for storage at locations of memory 38 determined by addresses asserted by unit 36 to memory 38. In some implementations, memory 38 functions as an I/O buffer for the DSP, and data indicative of the final convolution result is output from memory 38 (as output data "OUTPUT1") to pattern signal generator 16. In other implementations, data indicative of the final convolution result streams directly (or through a buffer) to pattern signal generator 16 from ACU 34 (as output data "OUTPUT2").

Figure 4:
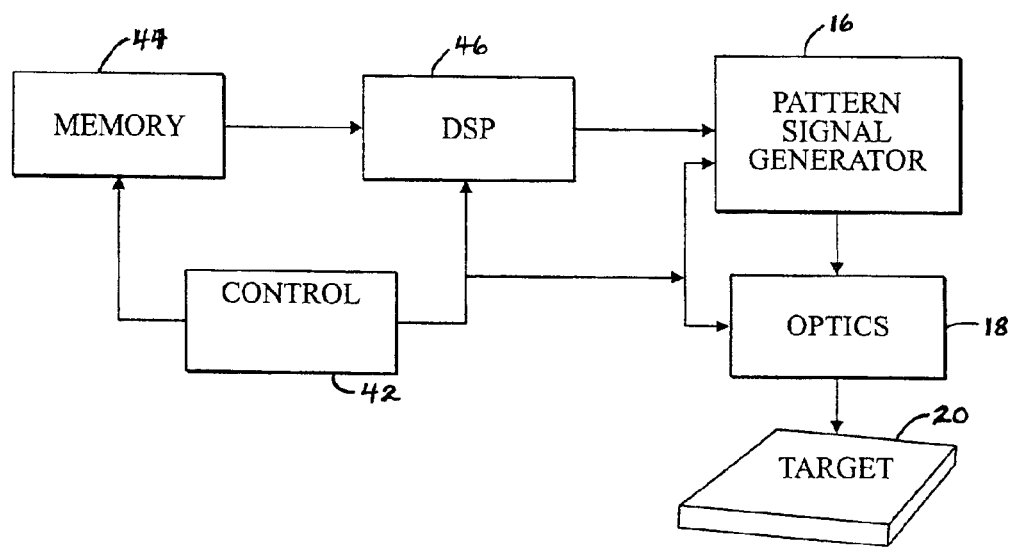
FIG. 4 is a block diagram of a lithography system which is a variation on the system of FIG. 2.

FIG. 4 is a variation on the system of FIG. 2, in which elements 16, 18, and 20 are identical to identically numbered elements of FIG. 2. In the FIG. 4 embodiment, element 46 is configured to perform convolution (in accordance with any embodiment of the invention) on image data (determining the pattern p to be convolved) which it receives from memory unit 44. Element 46 (which can be a digital signal processor including digital signal processing circuitry configured to perform convolution on data in accordance with any embodiment of the inventive method, custom or dedicated electronic circuitry configured to perform convolution on data in accordance with any embodiment of the inventive method, or a programmable gate array-based computing system configured to perform convolution on data in accordance with any embodiment of the inventive method) processes the image data to generate output data indicative of the convolution result $r=Kp$. The output data is streamed directly from DSP to pattern signal generation device 16, and device 16 generates a pattern signal in response to the output data from element 46. Controller 42 of the FIG. 4 system provides appropriate control signals to elements 44, 46, 16, and 18, and is capable (for example) of downloading instructions to element 46 to cause it to execute the convolution operation with specified parameters.

It is contemplated that the DSP of FIG. 3 can implement any embodiment of the inventive method. At the end of a convolution operation, processed data indicative of the convolution result r=Kp will have been generated. This data can be streamed directly to device 16, or it can be further processed (e.g., in unit 34) and thereafter asserted to device 16 or to memory 14.

The inventive method can implement any convolution (r=d×p), provided that the convolution kernel ("d") is sufficiently smooth to be adequately approximated by a separated-spline kernel ("k"), in the following sense. Kernel "d" is adequately approximated by separated-spline kernel "k" if the error inherent in the method (which is (k−d)×p) is within acceptable limits. Typically, convolution kernels "d" employed in the field of electron beam lithography proximity error correction are sufficiently smooth to be adequately approximated by a separated-spline kernel "k." Convolution kernels that are noisy (random), such as those encountered in cryptography, are typically not sufficiently smooth to be adequately approximated by a separated-spline kernel "k."

Figure 5:
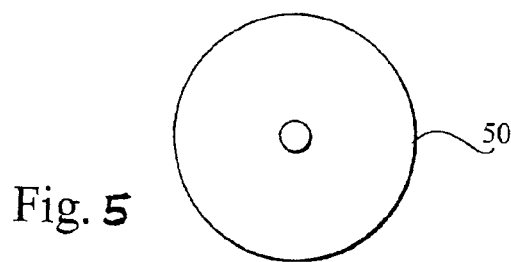
FIG. 5 is a simplified elevational view of a computer-readable storage medium (a CD-ROM) which stores computer-executable instructions, wherein the instructions are such that a computer performs an embodiment of the inventive method in response to executing the instructions.

FIG. 5 is a simplified elevational view of computer-readable storage medium 50 (which is a CD-ROM) which stores computer-executable instructions (software). The instructions are such that a computer performs an embodiment of the inventive method in response to executing the instructions.

Although the invention has been described in connection with specific preferred embodiments, it should be understood that the invention as claimed should not be unduly limited to such specific embodiments. For example, it is contemplated that in some embodiments the invention is implemented by hardwired circuitry (e.g., custom or dedicated electronic circuitry) or FPGA systems (field programmable gate array based computing systems) rather than in software or by a system including a digital signal processor ("DSP").

What is claimed is:

1. A method for performing convolution of an n-dimensional pattern $p(x_1, \ldots, x_n)$, with a smooth kernel d which is at least approximately equal to a separated-spline kernel, to generate data indicative of a convolution result r=Dp=d×p, where D is the circulant of d, and n is greater than one, said method including the steps of:

(a) specifying the separated-spline kernel as $k(x_1, \ldots, x_n)=k_1(x_1) \ldots k_n(x_n)$, where $k_j$ has circulant $K_j$, $k(x_1, \ldots, x_n)$ admits of an operator $A=A_1A_2 \ldots A_n$, and $A_j$ is an annihilation or flattening operator which operates on the circulant $K_j$ of kernel $k_j$ in such a manner that $A_jK_j$ is sparse (when $A_j$ is an annihilation operator) or $A_jK_j$ is almost everywhere a locally constant matrix (when $A_j$ is a flattening operator);

(b) processing pattern data indicative of the pattern p and kernel data indicative of the kernel $k_1$ to generate additional data indicative of $q_1=A_1k_1\times p$ for each row of the pattern p;

(c) processing the additional data to backsolve $A_1r_1=q_1$ for said each row of the pattern to determine data indicative of $r_1=k_1\times p$ for said pattern, by performing a preliminary ignition step in which a small number of components of $r_1$ are computed directly, and then determining all other ones of the components of $r_1$ using a natural recurrence relation determined by the operator $A_1$;

(d) processing the data indicative of $r_1=k_1\times p$ to generate data indicative of $q_2=A_2k_2\times(k_1\times p)^T$ for each row of $(k_1\times p)^T$, where $r_1^T=(k_1\times p)^T$ denotes transposition of $r_1$; and (e) processing the data indicative of $q_2=A_2k_2\times r_1^T$ to backsolve $A_2r_2^T=q_2$ for said each row of $(k_1\times p)^T$ thereby determining data indicative of $r_2^T=(k_2\times k_1\times p)^T$ for said pattern p.

2. The method of claim 1, wherein n=2, and step (e) includes the step of performing a transposition on the data indicative of $r_2^T=(k_2\times k_1\times p)^T$ to generate data indicative of $r=(k_2\times k_1\times p)$ for said pattern, where r is a close approximation to the convolution Dp.

3. The method of claim 2, also including the steps of:

(f) generating a pattern signal in response to convolved image data determined at least in part by the data indicative of $r=(k_2\times k_1\times p)$ for said pattern; and (g) causing the pattern signal to be incident on a set of optics, and projecting a pattern image from the optics onto a lithography target in response to the pattern signal.

4. The method of claim 3, wherein the pattern signal is an optical signal.

5. The method of claim 3, wherein the pattern signal is an electron beam signal.

6. The method of claim 3, wherein the convolved image data employed in step (f) is said data indicative of $r=(k_2\times k_1\times p)$ for said pattern.

7. The method of claim 1, wherein n is greater than 2, and also including the step of:

(f) after determining the data indicative of $r_2^T=(k_2\times k_1\times p)^T$ for said pattern, performing j iterations of steps (d) and (e), wherein during the i-th iteration of steps (d) and (e), where i is a positive integer and j=(n−2), data indicative of $q_{l+2}=A_{l+2}k_{l+2}\times q_{i+1}$ and of $r_{l+2}^T=(k_{l+2}\times k_{l+1}\times \ldots \times k_1\times p)^T$ are generated.

8. The method of claim 1, wherein the pattern data is stored in memory locations of a memory prior to step (b), and wherein step (d) includes the steps of:

(i) storing the data indicative of $r_1=k_1\times p$ in the memory such that data indicative of each column of $(k_1\times p)$ occupies a row of the memory locations formerly occupied by the pattern data indicative of a row of p; and (ii) during generation of the data indicative of $q_2=A_2k_2\times(k_1\times p)^T$ for said each row of $(k_1\times p)^T$, reading data indicative of one said column of $(k_1\times p)$ from one said row of the memory locations.

9. A method for performing convolution of a two-dimensional pattern p(x, y), with a smooth kernel d which is at least approximately equal to a separated-spline kernel, to generate data indicative of a convolution result r=Dp=d×p, where D is the circulant of d, said method including the steps of:

(a) specifying the separated-spline kernel as $k(x,y)=k_1(x)k_1(y)$, where $$k_1(x) = (R^2 - x^2) \quad \text{for } |x| \leq R$$
  $$= cd^{-|x|} \quad \text{for } |x| > R,$$

and where the kernel $k_1(x)$ satisfies:

$$k_1(x)=k_c(x)+k_+(x)+k_-(x),$$

where $k_c(x)$ is a kernel $$k_c(x) = (R^2 - x^2) \text{ for } |x| \leq R$$
$$= 0 \quad \text{for } |x| > R,$$

$k_+(x)$ is a one-tailed Laplacian kernel $$k_+(x) = cd^{-|x|} \text{ for } |x| > R$$
$$= 0 \quad \text{for } |x| \leq R,$$

and $k_-(x)$ is a one-tailed Laplacian kernel $$k_-(x) = cd^x \text{ for } |x| < -R$$
$$= 0 \quad \text{for } |x| \geq R;$$

(b) processing pattern data indicative of the pattern p and kernel data indicative of the kernel $k_c$, the kernel $k_+$, and the kernel $k_-$ to generate additional data indicative of a cap convolution $k_c \times p(x)$ for each row of the pattern p, a second convolution $k_+ \times p(x)$ for said each row, and a third convolution $k_- \times p(x)$ for said each row, and adding together the additional data indicative of the cap convolution, the second convolution, and the third convolution for said each row to generate data indicative of $q_1 = k_1 \times p(x,y) = (k_c \times p(x,y)) + (k_+ \times p(x,y)) + (k_- \times p(x,y))$, wherein the data indicative of the cap convolution is generated by computing $A_c k_c \times p(x)$ for said each row, where $A_c$ is an annihilation operator defined as $A_c k_c(x) := k_c(x+3) - 3k_c(x+2) + 3k_c(x+1) - k_c(x)$, and computing $A_c^{-1}(A_c k_c \times p)(x) = k_c \times p(x)$ using the recursion relation $$k_c(x+3) = A_c k_c(x) + k_c(x) + 3k_c(x+2) - 3k_c(x+1),$$

the data indicative of the second convolution is generated by computing $A_+ k_+ \times p(x)$, for said each row, where $A_+$ is an annihilation operator defined as
$A_+ k_+(x) = k_+(x+1) - d^{-1} k_+(x)$, and computing $A_+^{-1}(A_+ k_+ \times p)(x) = k_+ \times p(x)$ using the recursion relation:

$$(k_+ \times p)(x+1, y) = (A_+ k_+ \times p)(x,y) + d^{-1}(k_+ \times p)(x,y),$$

and
the data indicative of the third convolution is generated by computing $A_- k_- \times p(x)$, for said each row, where $A_-$ is an annihilation operator defined as
$A_- k_-(x) = k_-(x-1) - d^{-1} k_-(x)$, and computing $A_-^{-1}(A_- k_- \times p)(x) = k_- \times p(x)$ by recursing from end to beginning using the recursion relation:

$$(k_- \times p)(x-1, y) = (A_- k_- \times p)(x,y) + d^{-1}(k_- \times p)(x,y);$$

(c) transposing the data indicative of $(k_1 \times p(x,y))$ to generate data indicative of $(k_1 \times p(x,y))^T$; and
(d) repeating step (b), this time by processing the data indicative of $(k_1 \times p(x,y))^T$, rather than the pattern data, with the kernel data, thereby generating data indicative of $q_1^T = (k_1(x) \times k_1(y) \times p(x,y))^T$.

10. The method of claim 9, wherein the pattern data is stored in memory locations of a memory prior to step (b), and wherein step (c) is accomplished by storing the data indicative of $(k_1 \times p)$ in the memory such that data indicative of each column of $(k_1 \times p)$ occupies a row of the memory locations formerly occupied by the pattern data indicative of a row of p(x,y).

11. The method of claim 9, also including the step of:
(e) transposing the data indicative of $q_1^T = (k_1 \times k_1 \times p)^T$ to produce data indicative of $r = k \times p$.

12. The method of claim 11, also including the steps of:
(f) generating a pattern signal in response to convolved image data determined at least in part by the data indicative of $r = k \times p$; and
(g) causing the pattern signal to be incident on a set of optics, and projecting a pattern image from the optics onto a lithography target in response to the pattern signal.

13. The method of claim 12, wherein the pattern signal is an optical signal.

14. The method of claim 12, wherein the pattern signal is an electron beam signal.

15. A method for performing convolution of a two-dimensional pattern p(x, y), with a smooth kernel d which is at least approximately equal to a separated kernel, to generate data indicative of a convolution result $r(x,y) = Dp = d \times p$, where D is the circulant of d, said method including the steps of:

(a) specifying the separated kernel as $k(x,y) = k_2(x) k_2(y)$, with k(x,y) approximating the kernel d, where $$k_2(x) = 2\cos^2(\pi x / 2R) \text{ for } |x| \leq R,$$
$$k_2(x) = 0 \quad \text{for } |x| > R;$$

(b) processing pattern data indicative of each row of the pattern p and kernel data indicative of the kernel $k_2$ to
(i) generate data indicative of $Ak_2 \times p$ for said each row, for $-R -3 \leq x \leq n-1$, where $Ak_2(x) \times p(x) = B(p(x+R) + p(x+R+1) - p(x-R) - p(x-R+1))$; and
(ii) performing a recursion operation, using the recursion relation $r(x+2) = Ar(x) + B(r(x+1) - r(x)) + r(x-1)$, and using the relations $r(-R-4) = r(-R-3) = r(-R-2) = 0$ to ignite said recursion operation, to find $r(x) = A^{-1}(Ak_2(x) \times p(x))$ for said each row, thereby producing, at the end of a final iteration of step (ii), data indicative of $k_2 \times p$;

(c) transposing the data indicative of $k_2 \times p$ to produce data indicative of $(k_2 \times p)^T$; and
(d) repeating step (b), this time on rows of the data indicative of $(k_2 \times p)^T$ rather than on the rows of the pattern data, thereby generating data indicative of convolution of all columns of $k_2 \times p$ with $k_2$.

16. The method of claim 15, wherein steps (b), (c), and (d) are performed by a programmed processor, the processor is in an initial state at the start of step (b), and after step (d), the processor performs the additional steps of:
(e) transposing the data indicative of convolution of all columns of $k_2 \times p$ with $k_2$ to produce data indicative of the convolution result r(x,y); and
(f) after step (e), returning to the initial processor state.

17. The method of claim 16, also including the steps of:
(g) generating a pattern signal in response to convolved image data determined at least in part by the data indicative of the convolution result r(x,y); and
(h) causing the pattern signal to be incident on a set of optics, and projecting a pattern image from the optics onto a lithography target in response to the pattern signal.

18. The method of claim 17, wherein the pattern signal is an optical signal.

19. The method of claim 17, wherein the pattern signal is an electron beam signal.

20. The method of claim 15, wherein the pattern data is stored in memory locations of a memory prior to step (b), and wherein step (c) is accomplished by storing the data indicative of $k_2 \times p$ in the memory such that data indicative of each column of $(k_2 \times p)$ occupies a row of the memory locations formerly occupied by the pattern data indicative of a row of p(x,y).

21. The method of claim 15, wherein $B=2\sin^2(\pi/2L)$.

22. The method of claim 15, wherein $B=1$.

23. A computer system, comprising:

a processor programmed with software for convolving first data indicative of an n-dimensional pattern $p(x_1, \ldots, x_n)$, with a smooth kernel d at least approximately equal to a separated-spline kernel, to generate data indicative of a convolution result $r = Dp = d \times p$, where D is the circulant of d, and n is greater than one, by processing second data, indicative of a separated-spline kernel $k(x_1, \ldots x_n) = k_1(x_1) \ldots k_n(x_n)$ which approximates d, where $k_j$ has circulant $K_j$, the kernel $k(x_1, \ldots, x_n)$ admits of an operator $A = A_1 A_2 \ldots A_n$, where $A_j$ is an annihilation or flattening operator which operates on the circulant $K_j$ of kernel $k_j$ in such a manner that $A_j K_j$ is sparse (when $A_j$ is an annihilation operator) or $A_j K_j$ is almost everywhere a locally constant matrix (when $A_j$ is a flattening operator), with said first data to generate third data indicative of $q_1 = A_1 k_1 \times p$ for each row of the pattern p, and processing the third data to backsolve $A_1 r_1 = q_1$ for said each row of the pattern to determine fourth data indicative of $r_1 = k_1 \times p$ for said pattern, and processing the fourth data to generate fifth data indicative of $q_2 = A_2 k_2 \times (k_1 \times p)^T$ for each row of $(k_1 \times p)^T$, where $r_1^T = (k_1 \times p)^T$ denotes transposition of $r_1$, and processing the fifth data to backsolve $A_2 r_2^T = q_2$ for said each row of $(k_1 \times p)^T$ thereby determining sixth data indicative of $r_2^T = (k_2 \times k_1 \times p)^T$ for said pattern;

at least one memory coupled to and accessible by the processor, and configured to store at least the first data, the second data, and the fifth data; and an input device coupled to the processor, wherein the processor executes the software in response to at least one control signal from the input device.

24. The system of claim 23, wherein n=2, and the software causes the processor to perform a transposition on the sixth data to generate seventh data indicative of $r = (k_2 \times k_1 \times p)$ for said pattern, wherein the seventh data is said data indicative of the convolution result $r = Dp = d \times p$.

25. A digital signal processor, including:

digital signal processing circuitry configured to perform arithmetic operations on data including first data indicative of an n-dimensional pattern $p(x_1, \ldots, x_n)$, and second data indicative of a separated-spline kernel $k(x_1, \ldots, x_n) = k_1(x_1) \ldots k_n(x_n)$, where $k_j$ has circulant $K_j$, the kernel $k(x_1, \ldots, x_n)$ admits of an operator $A = A_1 A_2 \ldots A_n$, where $A_j$ is an annihilation or flattening operator which operates on the circulant $K_j$ of kernel $k_j$ in such a manner that $A_j K_j$ is sparse (when $A_j$ is an annihilation operator) or $A_j K_j$ is almost everywhere a locally constant matrix (when $A_j$ is a flattening operator), and said kernel k is at least approximately equal to a smooth kernel d having circulant D, where n is greater than one; and a program control unit coupled to the digital signal processing circuitry, and configured to generate control bits in response to instructions, and to assert the control bits to the digital signal processing circuitry to cause the digital signal processing circuitry to perform convolution on the first data by processing the first data and the second data to generate third data indicative of $q_1 = A_1 k_1 \times p$ for each row of the pattern p, and processing the third data to backsolve $A_1 r_1 = q_1$ for said each row of the pattern to determine fourth data indicative of $r_1 = k_1 \times p$ for said pattern, and processing the fourth data to generate fifth data indicative of $q_2 = A_2 k_2 \times (k_1 \times p)^T$ for each row of $(k_1 \times p)^T$, where $r_1^T = (k_1 \times p)^T$ denotes transposition of $r_1$, and processing the fifth data to backsolve $A_2 r_2^T = q$ for said each row of $(k_1 \times p)^T$ thereby determining sixth data indicative of $r_2^T = (k_2 \times k_1 \times p)^T$ for said pattern.

26. The system of claim 25, wherein n=2, and the control bits cause the digital processing circuitry to perform a transposition on the sixth data to generate seventh data indicative of $r = (k_2 \times k_1 \times p)$ for said pattern.

27. A lithography system, including:

a digital signal processor, comprising digital signal processing circuitry and a program control unit coupled to the digital signal processing circuitry, the digital signal processing circuitry being configured to perform arithmetic operations on data, including first data indicative of an n-dimensional pattern $p(x_1, \ldots, x_n)$, and second data indicative of a separated-spline kernel $k(x_1, \ldots, x_n) = k_1(x_1) \ldots k_n(x_n)$, where $k_j$ has circulant $K_j$, the kernel $k(x_1, \ldots, x_n)$ admits of an operator $A = A_1 A_2 \ldots A_n$, where $A_j$ is an annihilation or flattening operator which operates on the circulant $K_j$ of kernel $k_j$ in such a manner that $A_j K_j$ is sparse (when $A_j$ is an annihilation operator) or $A_j K_j$ is almost everywhere a locally constant matrix (when $A_j$ is a flattening operator), and said spline kernel k is at least approximately equal to a smooth kernel d having circulant D, where n is greater than one, in response to control bits from the program control unit, to perform convolution on the first data by processing the first data and the second data to generate third data indicative of $q_1 = A_1 k_1 \times p$ for each row of the pattern p, and processing the third data to backsolve $A_1 r_1 = q_1$ for said each row of the pattern to determine fourth data indicative of $r_1 = k_1 \times p$ for said pattern, and processing the fourth data to generate fifth data indicative of $q_2 = A_2 k_2 \times (k_1 \times p)^T$ for each row of $(k_1 \times p)^T$, where $r_1^T = (k_1 \times p)^T$ denotes transposition of $r_1$, and processing the fifth data to backsolve $A_2 r_2^T = q$ for said each row of $(k_1 \times p)^T$ thereby determining sixth data indicative of $r_2^T = (k_2 \times k_1 \times p)^T$ for said pattern, and performing a transposition on the sixth data to generate seventh data indicative of $r_2 = (k_2 \times k_1 \times p)$ for said pattern;

a pattern signal generator configured to generate a pattern signal in response to convolved image data determined at least in part by said seventh data; and a set of optics positioned so that the pattern signal is incident thereon, wherein the optics projects a pattern image on a lithography target in response to the pattern signal.

28. The lithography system of claim 27, wherein the digital signal processor asserts the seventh data to the pattern signal generator, and the pattern signal generator is configured to generate the pattern signal in response to said seventh data.

29. The lithography system of claim 27, wherein the pattern signal is an optical signal.

30. The lithography system of claim 29, wherein the optical signal is an optical beam and the set of optics is configured to focus the optical beam to generate a focused beam and to scan the focused beam relative to the lithography target.

31. The lithography system of claim 27, wherein the pattern signal is an electron beam signal.

32. The lithography system of claim 31, wherein the set of optics is configured to focus the electron beam signal to generate a focused electron beam and to scan the focused electron beam relative to the lithography target.

33. An apparatus configured to convolve a first signal indicative of an n-dimensional pattern $p(x_1, \ldots x_n)$, with a second signal indicative of a separated spline kernel $k(x_1, \ldots, x_n) = k_1(x_1) \ldots k_n(x_n)$ which approximates a smooth kernel d, where $k_j$ has circulant $K_j$, the kernel $k(x_1, \ldots, x_n)$ admits of an operator $A = A_1 A_2 \ldots A_n$, where $A_j$ is an annihilation or flattening operator which operates on the circulant $K_j$ of kernel $k_j$ in such a manner that $A_j K_j$ is sparse (when $A_j$ is an annihilation operator) or $A_j K_j$ is almost everywhere a locally constant matrix (when $A_j$ is a flattening operator), to generate a signal indicative of a convolution result $r = Dp = d \times p$, where D is the circulant of d, and n is greater than one, by generating from the first signal and the second signal a third signal indicative of $q_1 = A_1 k_1 \times p$ for each row of the pattern p, and processing the third signal to backsolve $A_1 r_1 = q_1$ for said each row of the pattern to generate a fourth signal indicative of $r_1 = k_1 \times p$ for said pattern, and generating from the fourth signal a fifth signal indicative of $q_2 = A_2 k_2 \times (k_1 \times p)^T$ for each row of $(k_1 \times p)^T$, where $r_1^T = (k_1 \times p)^T$ denotes transposition of $r_1$, and processing the fifth signal to backsolve $A_2 r_2^T = q_2$ for said each row of $(k_1 \times p)^T$ thereby generating a sixth signal indicative of $r_2^T = (k_2 \times k_1 \times p)^T$ for said pattern, whereby said sixth signal is at least approximately indicative of the convolution result $r = Dp$.

34. The apparatus of claim 33, wherein the apparatus consists of electronic circuitry.

35. The apparatus of claim 33, wherein the apparatus is a programmable gate array-based computing system.

36. A computer-readable storage medium which stores instructions, wherein the instructions are executable by a computer, and wherein the instructions are such that the computer performs a method for convolving first data indicative of an n-dimensional pattern $p(x_1, \ldots x_n)$, with a smooth kernel d at least approximately equal to a separated-spline kernel $k(x_1, \ldots x_n) = k_1(x_1) \ldots k_n(x_n)$, where $k_j$ has circulant $K_j$, the kernel $k(x_1, \ldots, x_n)$ admits of an operator $A = A_1 A_2 \ldots A_n$, where $A_j$ is an annihilation or flattening operator which operates on the circulant $K_j$ of kernel $k_j$ in such a manner that $A_j K_j$ is sparse (when $A_j$ is an annihilation operator) or $A_j K_j$ is almost everywhere a locally constant matrix (when $A_j$ is a flattening operator), to generate data indicative of a convolution result $r = Dp = d \times p$ in response to executing said instructions, where D is the circulant of d, and n is greater than one, said method including the steps of:

processing second data, indicative of the separated-spline kernel $k(x_1, \ldots, x_n) = k_1(x_1) \ldots k_n(x_n)$, with said first data to generate third data indicative of $q_1 = A_1 k_1 \times p$ for each row of the pattern p;

processing the third data to backsolve $A_1 r_1 = q_1$ for said each row of the pattern to determine fourth data indicative of $r_1 = k_1 \times p$ for said pattern;

processing the fourth data to generate fifth data indicative of $q_2 = A_2 k_2 \times (k_1 \times p)^T$ for each row of $(k_1 \times p)^T$, where $r_1^T = (k_1 \times p)^T$ denotes transposition of $r_1$;

processing the fifth data to backsolve $A_2 r_2^T = q_2$ for said each row of $(k_1 \times p)^T$ thereby determining sixth data indicative of $r_2^T = (k_2 \times k_1 \times p)^T$ for said pattern; and performing a transposition on the sixth data to generate seventh data indicative of $r = (k_2 \times k_1 \times p)$ for said pattern, whereby said seventh data is at least approximately indicative of the convolution result $r = Dp$.

* * * * *